US007934382B2

(12) United States Patent
Burd

(10) Patent No.: US 7,934,382 B2
(45) Date of Patent: May 3, 2011

(54) COMBUSTOR TURBINE INTERFACE

(75) Inventor: Steven W. Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 705 days.

(21) Appl. No.: 11/315,838

(22) Filed: Dec. 22, 2005

(65) Prior Publication Data

US 2007/0144177 A1 Jun. 28, 2007

(51) Int. Cl.
*F02C 1/00* (2006.01)

(52) U.S. Cl. .......... 60/752; 60/806

(58) Field of Classification Search .......... 60/806, 60/752-760

See application file for complete search history.

(56) References Cited

U.S. PATENT DOCUMENTS

| | | | | |
|---|---|---|---|---|
| 4,567,730 A | * | 2/1986 | Scott | 60/757 |
| 4,901,522 A | * | 2/1990 | Commaret et al. | 60/800 |
| 5,101,620 A | * | 4/1992 | Shekleton et al. | 60/804 |
| 5,226,278 A | * | 7/1993 | Meylan et al. | 60/755 |
| 5,252,026 A | * | 10/1993 | Shepherd | 415/115 |
| 5,291,732 A | * | 3/1994 | Halila | 60/796 |
| 5,398,496 A | * | 3/1995 | Taylor et al. | 60/796 |
| 5,417,545 A | * | 5/1995 | Harrogate | 415/115 |
| 5,435,139 A | | 7/1995 | Pidcock et al. | |
| 5,480,162 A | | 1/1996 | Beeman, Jr. | |
| 5,628,193 A | * | 5/1997 | Kington et al. | 60/752 |
| 5,758,503 A | | 6/1998 | DuBell et al. | |
| 6,269,628 B1 | * | 8/2001 | Gates | 60/804 |
| 6,314,716 B1 | | 11/2001 | Abreu et al. | |
| 6,571,560 B2 | * | 6/2003 | Tatsumi et al. | 60/753 |
| 2002/0116929 A1 | | 8/2002 | Snyder | |
| 2004/0139746 A1 | * | 7/2004 | Soechting et al. | 60/752 |
| 2004/0211188 A1 | | 10/2004 | Alkabie | |
| 2005/0120718 A1 | * | 6/2005 | Markarian et al. | 60/800 |
| 2006/0032237 A1 | * | 2/2006 | Aumont et al. | 60/796 |
| 2006/0196188 A1 | * | 9/2006 | Burd et al. | 60/754 |

FOREIGN PATENT DOCUMENTS

| | | |
|---|---|---|
| DE | 19733868 A1 | 2/1998 |
| EP | 0321320 A1 | 6/1989 |
| EP | 1270874 A1 | 1/2003 |
| EP | 1433924 A2 | 6/2004 |

OTHER PUBLICATIONS

Partial European Search Report for Application No. 06256373.9 dated Aug. 30, 2010.
Extended European Search Report mailed on Dec. 28, 2010 for Application No. EP06256373.9.

* cited by examiner

*Primary Examiner* — Michael Cuff
*Assistant Examiner* — Phutthiwat Wongwian
(74) *Attorney, Agent, or Firm* — Carlson, Gaskey & Olds, P.C.

(57) ABSTRACT

A combustor assembly for a turbine engine includes an aft open end that communicates gas flow to a turbine assembly. The combustor assembly includes a liner assembly that terminates at a first fixed vane. A portion of the liner assembly extends an axial distance into the first fixed vane portion. An inner surface of the liner assembly corresponds with inner surfaces of the fixed vane portion to provide a smooth transition from the inner surfaces of the combustor assembly to the turbine assembly.

10 Claims, 3 Drawing Sheets

COMBUSTOR TURBINE INTERFACE

BACKGROUND OF THE INVENTION

This invention relates generally to a combustor assembly for a gas turbine engine. More particularly, this invention relates to an interface between a combustor assembly and a fixed turbine vane portion of a gas turbine engine.

A gas turbine engine typically includes a combustor for igniting a mixture of fuel and compressed air to produce a gas flow. The combustor typically includes an outer shell supporting a plurality of inner heat shields. The inner heat shields are exposed to elevated temperatures produced by ignition of the fuel-air mixture and the resulting gas flow.

Gas flow exiting the combustor enters a fixed array of turbine vanes that directs gas flow to downstream rotating turbine blades. The fixed vanes are intermediate the combustor and the rotating turbine blades. Typically, the support shell and heat shield articles at the aft end of the combustor module terminate at a common axial position or plane upstream of the fixed vanes. The transition of this dual-wall combustor liner system to the downstream endwall or platform (inner and outer diameter flow path surfaces of the turbine vane cascade) create a seam, step or interrupted surface between internal surfaces of the combustor and the surfaces at the inner or outer diameter of the fixed vane cascade.

Disadvantageously, such interrupted surfaces at the interface between the fixed vane array and the combustor interfere with cooling and core gas flows exiting the combustor. The insulating layer of cooling air along the inner surface of the combustor is disrupted by the interface with the fixed vane portion causing undesirable mixing of the cooling air with the hot core gases. This can lead to decreases in the cooling effectiveness of the cooling air and promote elevated temperatures or adverse temperature gradients on the combustor and turbine hardware in this region. Additionally, disruption of the gas flow that moves downstream into the fixed vane causes undesirable aerodynamic properties and thermal profiles that can potentially degrade the downstream turbine and, hence, overall engine performance.

Accordingly, it is desirable to develop an interface between a combustor assembly and a turbine assembly that provides a smooth transition of the cooling and core gas flows in vicinity of the exit of the combustor and proximate to the entrance to the downstream turbine vane.

SUMMARY OF THE INVENTION

An example combustor assembly for a turbine engine according to this invention includes a combustor liner assembly incorporating a heat shield article having an aft segment or lip corresponding to a fixed vane portion of the turbine assembly that provides a desirable interface between the combustor assembly and the fixed vane portion.

The example combustor assembly according to this invention includes a combustor liner assembly incorporating a heat shield article having an aft segment or lip corresponding to a fixed vane portion of a turbine assembly to form a smooth interface for gas flow. The aft segment or lip extends an axial distance greater than the remainder of the combustor assembly (and underlying shell) into the endwall region of the downstream fixed vane. The fixed vane endwall includes a landing that receives the aft lip such that the portions of the lip and endwall exposed to the core flow provide a smooth curvature in moving axially. The smooth axial profile provided by the lip and landing provide the desired aerodynamic properties for the cooling and gas flow at the transition between the combustor and the turbine endwalls. Moreover, the geometry of the landing is configured to tailor cooling patterns and limited unwanted cooling air leakage in this region.

Accordingly a combustor assembly according to this invention provides for the smooth transition of cooling and core flow gas streams from the combustor assembly through the fixed vanes and into the downstream turbine hardware.

These and other features of the present invention can be best understood from the following specification and drawings, the following of which is a brief description.

DETAILED DESCRIPTION OF THE PREFERRED EMBODIMENT

Figure 1:
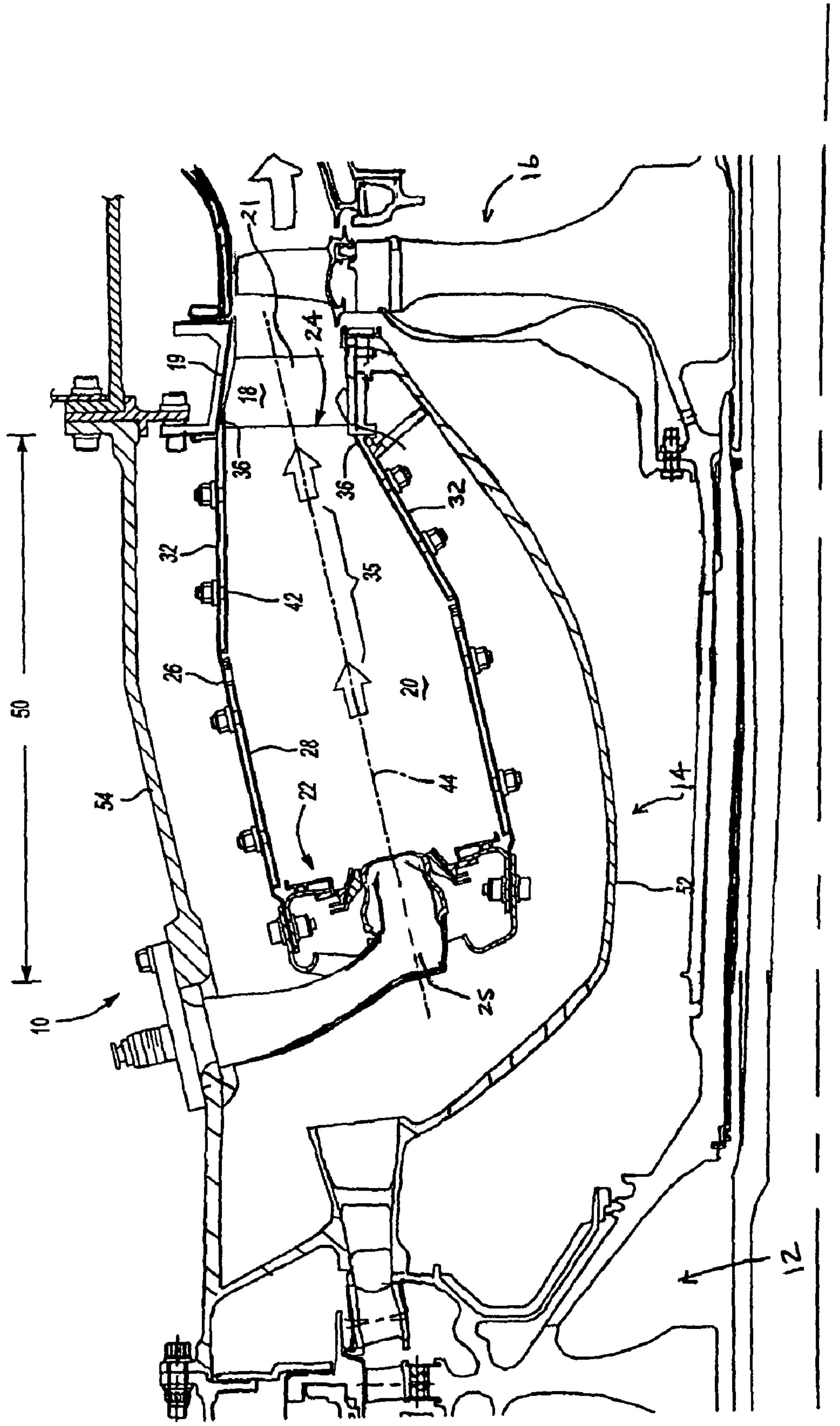
FIG. 1 is a schematic cross-section of an example gas turbine engine combustor and turbine assembly according to this invention.

Referring to FIG. 1, an engine assembly 10 according to this invention includes a fan (not shown), a compressor 12 that supplies compressed air to a combustor assembly 14. Combustion gasses generated within the combustor assembly 14 flows into a turbine assembly 16. The gas turbine engine assembly 10 is shown schematically and illustrates an annular combustor although it is within the contemplation of this invention for application in other known combustor assembly configurations.

The combustor assembly 14 is disposed annularly about an axis 30 and includes an axial length 50. The combustor assembly 14 is secured within an inner (diffuser) case wall 52 and an outer (diffuser) case wall 54, each annularly disposed about the axis 30. The combustor assembly features a liner assembly 15 that is supported within the inner case wall 52 and outer case wall 54. The liner assembly 15 includes an outer shell 26 supporting a plurality of inner heat shields 28 that define an inner surface 42 of a combustor chamber 20. A passage 32 for cooling air is disposed between the outer shell 26 and the inner heat shields 28.

The combustor chamber 20 includes a forward portion or bulkhead assembly 22 that includes a fuel injector 25 and other opening for supplying fuel and air into the combustion chamber 20 to begin combustion. The heat shields 28 are disposed in several segments about the outer shell 26 an combine to protect and thermally isolate the hot gases produced within the combustion chamber 20 from outer features of the combustor assembly 14.

The combustor chamber 20 is disposed about a centerline 44 disposed annularly about the axis 30. The combustor chamber 20 includes an aft open end 24 for directing gas flow 35 to a fixed vane cascade array 18 and the downstream stages of the turbine assembly 16. The first fixed vanes 18 include base portions 19 that support an airfoil 21 proximate the aft open end 24 of the combustor chamber 20. The base portions 19 are affixed to the end of the combustor assembly 14 or cases as part of the engine assembly, with a transition region between the combustor assembly 14 and the turbine assembly 16.

The inner heat shields 28 disposed at the aft open end 24 include an aft segment or lip 36. The aft lip 36 extends past the axial length 50 of the combustor assembly 14 and into the fixed vane portion 18. The aft lip 36 overlaps a portion of the base portions 19 and provides a desired smooth interface for cooling air and gas flow 35 from the combustor chamber 20 into the vane passage 18 and remaining turbine assembly 16.

Figure 2:
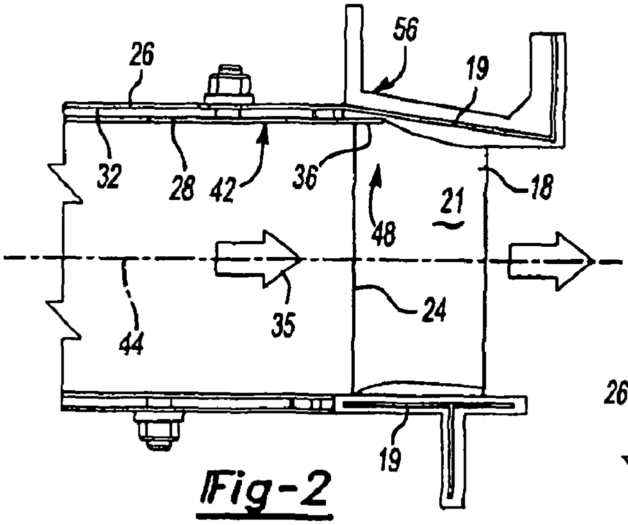
FIG. 2 is a schematic cross-section of an example interface between a combustor assembly and the endwall of the fixed vane portion according to this invention.

Referring to FIG. 2, the aft open-end 24 interfaces with the fixed vane portion 18 to define the transition region for gas flow 35 to the turbine assembly 16. Hot combustion gases flow 35 inside the combustion chamber and are exposed to the hot-side surface 42 of the inner heat shields 28. A buffer layer of cooling airflow is directed adjacent the hot side surface 42 of the inner heat shields 28. Interruptions or discontinuities in the hot side surface 42 can potentially cause adverse disturbances in the cooling and gas flows 35. The transition between the aft open end 24 of the combustor chamber 20 and the fixed vane portion 18 is substantially uninterrupted due to the aft lip 36 extending axially into the fixed vane 18 and the smooth curvature provided herein.

Figure 3:
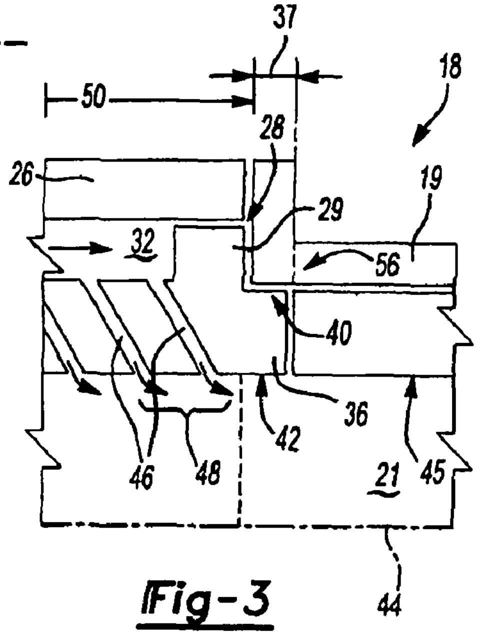
FIG. 3 is an enlarged schematic cross-section of an example interface between a combustor assembly and the endwall of the fixed vane portion according to this invention.

Referring to FIG. 3, an enlarged view of interface 56 between the aft lip of the combustor heat shield 36 and the fixed vane endwall 18 is shown. The aft lip 36 extends an axial distance 37 past the length 50 of the combustor assembly 14. The fixed vane 18 includes a landing 40 for receiving the aft lip 36. The hot side surface 42 of the inner heat shield 28 corresponds with an inner surface 45 of the fixed vane endwall 18 to provide a smooth transition through the interface 56. The smooth transition is provided by the hot side surface 42 being disposed flush with the hot side surface 42. Further, the hot side surface 42 may also be disposed radially inwardly toward the centerline 44 or transversely vary in shape relative to the inner surface 45 to accommodate or match curvature in the downstream endwall. The flush, radially inward or transverse relationship between the hot side surface 42 and the inner surface 45 substantially eliminates features normal and/or transverse to gas flow 35 about the interface 56. The elimination of these features substantially reduces potential disturbances in the cooling air and gas flow 35 through the interface 56.

The example heat shield 28 includes a plurality of cooling openings 46 through which cooling air 48 flows to create a layer of cooling air along the hot side surface 42. The cooling openings 46 are disposed within the heat shield 28 to an aft most end of the combustor chamber 20. Such a configuration provides cooling airflow 48 into the interface 56. Although the example interface 56 is illustrated with cooling openings 46, the benefits provided by the uninterrupted smooth transition provided by the aft lip 36 also apply to heat shield configurations that do not included cooling openings.

The example heat shield 28 includes a support feature 29 abutting the outer shell 26 substantially adjacent the aft portion of the combustion chamber 20. The support feature 29 supports the aft portion and specifically of the aft lip 36 of the inner heat shield 28.

The aft lip 36 extends into the landing 40 of the fixed vane portion 18 the axial distance 37. The axial distance 37 is between preferentially between 0.10 and 1.0 inches and, more preferentially between 0.20 and 0.50 inches. However, the specific axial distance is determined in accordance with desired sealing requirements, and with respect to desired tolerances and clearances required to accommodate manufacturing tolerances and thermal expansion of the combustor assembly 14 and the fixed vane 18. Additionally, the aft lip 36 generally follows the axial and radial circumferential contour of the interface 56 between the liner assembly and the fixed vane portion 18 and may include additional contours to provide a desired streamline transition through the fixed vane portion 18.

Figure 4:
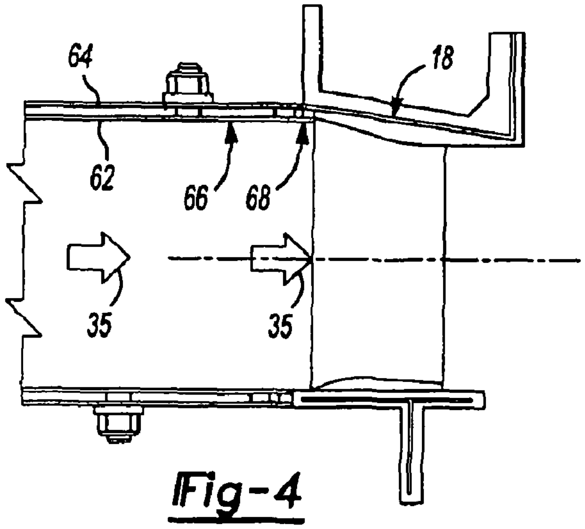
FIG. 4 is a schematic cross-sectional view of another example interface between a combustor assembly and the endwall of the fixed vane portion according to this invention.
Figure 5:
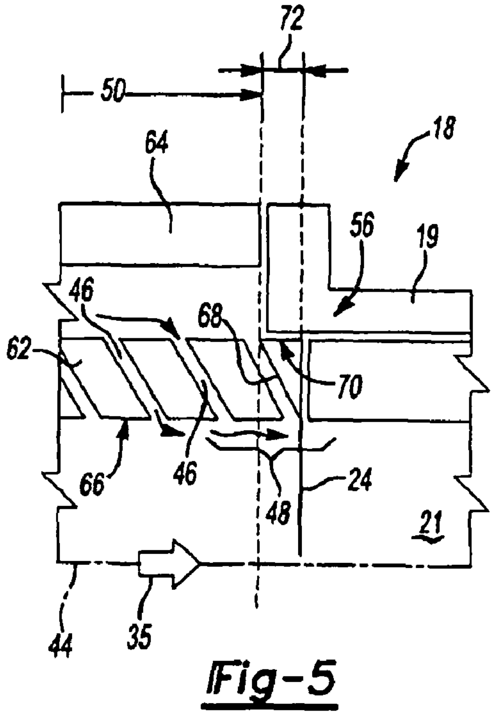
FIG. 5 is an enlarged schematic view of an example interface between the combustor assembly and the endwall of the fixed vane portion according to this invention.

Referring to FIGS. 4 and 5, another example combustor liner assembly 60 according to this invention is shown and includes an aft lip 68 that is a portion of an inner heat shield 62. The inner heat shield 62 defines the inner surface 66 of the combustor chamber, directing the gas flow 35 out of the combustor chamber 20 and into the fixed vane portion 18. The aft lip 68 extends an axial distance 72 into the fixed vane portion 18. The fixed vane portion 18 includes a landing 70 that is disposed and configured to receive the aft lip 68. The overlapping features may also extend radially and circumferentially about the arcuate shape of the heat shield and turbine endwall and the interface 56 between the liner assembly 15 and the first fixed vane portion 18.

The aft lip 68 extends into the first fixed vane portion 18 and is supported at least partially by the landing 70. The aft portion of the heat shield 68 is not supported at the aft most end of the outer shell 64. The aft most support structure for the heat shield 68 is disposed upstream of or near the aft open end 24 such that cooling air 48 is free to be communicated to the furthest aft portions of the aft lip 68. Communication of cooling air 48 is facilitated by a cooling opening(s) 46 that is disposed past the axial length 50 of the combustor assembly 14 within the axial distance 72. The communication of cooling air to the furthest aft portion provides design flexibility and may improve the uniformity and effective axial distance into which cooling can introduced into the fixed vane portion 18. Such cooling capability can provide increases in cooling flow effectiveness improves durability within the interface 56 by improving temperature uniformity and heat transfer capability through the transition region to the turbine assembly 16 and design flexibility to effectively manage cooling budgets and/or unwanted leakage.

Further, cooling airflow 48 acts as the effective inner surface or boundary for the gas flow 35. Increasing the effective axial length of the cooling air boundary airflow 48 improves the transitional aerodynamic properties of the gas flow. This is accomplished by substantially eliminating abrupt changes in boundary airflow with regard to the gas flow 35.

Figure 6:
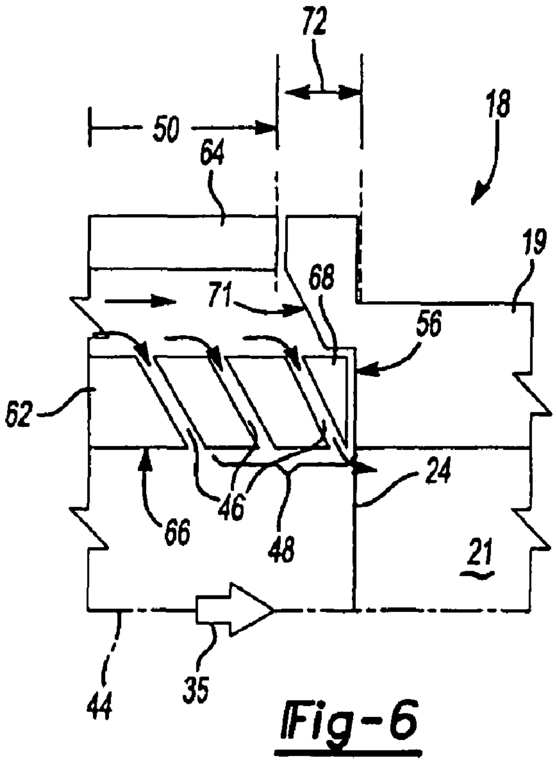
FIG. 6 is another enlarged schematic view of an example interface between the combustor assembly and the endwall of the fixed vane portion according to this invention.

Referring to FIG. 6, the aft lip 68 includes the cooling openings 46 that are angled relative to the inner surface 66. A landing 71 includes a tailored geometric shape that supports the heat shield 62 and cooperates with the geometric shape of the landing 71 to aid in the tailoring of cooling airflow 48. The landing 71 includes an angled surface that operates to aid and direct cooling airflow through the cooling openings 46 adjacent extreme ends of the heat shield 62.

Figure 7:
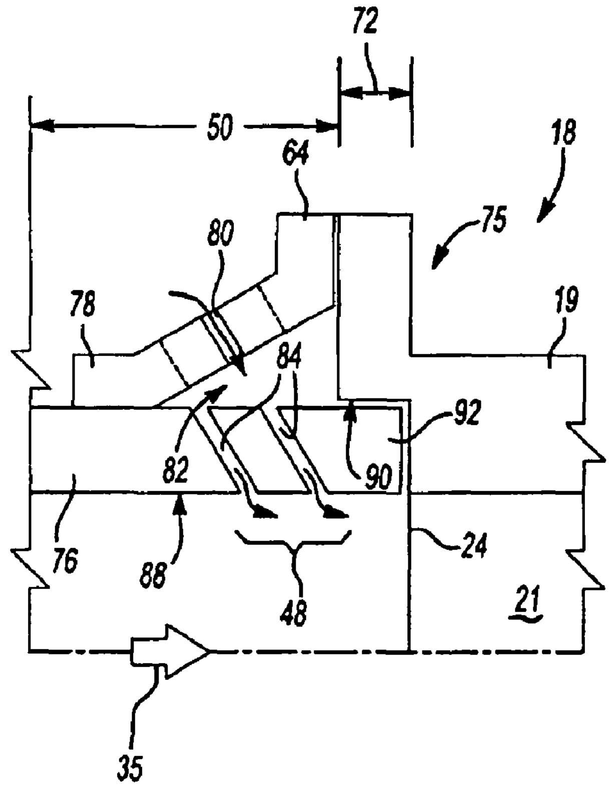
FIG. 7 is yet another enlarged schematic view of an example interface between the combustor assembly and the endwall of the fixed vane portion according to this invention.

Referring to FIG. 7, another interface 75 between an aft lip 92 of a single wall liner 76 includes a brace 78 supporting the aft lip 92. Further the brace 78 includes an opening 80 for cooling air such that cooling air 48 is communicated into the interface 75 between the fixed airfoil 21 and the liner 76. The liner 76 includes an inner surface 88 having the plurality of cooling air openings 84. The aft lip 92 abuts and is supported on a landing 90 of the base portion 19. The brace 78 further supports the aft lip 92 and provides the cavity 82 for communication of cooling air 48 to the inner surface 88.

Accordingly, an example combustor assembly according to this invention includes features corresponding with a fixed vane portion to smooth the aeromechanical transition between the combustor and the turbine assembly. Further, application of this invention promotes enhanced and cooling flow and leakage management through the integrated combustor-turbine design and decreased discontinuities within the transition region of the combustor assembly and the fixed vane portion 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A combustor assembly for a turbine engine comprising:

a combustor chamber having an aft open end for communicating gas flow to a turbine assembly including a turbine vane;

a combustor liner having an aft lip that defined an outlet end, the aft lip extending an axial distance past the aft open end of the combustion chamber and at least partially into the turbine assembly, wherein the aft lip overlaps a portion of the turbine vane such that part of the turbine vane is disposed downstream of the outlet end and a cooling air opening that extends through the aft lip at least partially within the axial distance past the aft open end of the combustion chamber.

2. The assembly as recited in claim 1, wherein the turbine assembly includes a transition region comprising a plurality of fixed turbine vanes, and said aft lip overlaps a portion of the turbine vanes.

3. The assembly as recited in claim 1, wherein combustor chamber is disposed annularly about a central axis of the turbine engine.

4. The assembly as recited in claim 1, wherein said liner comprises a plurality of longitudinal segments and each of said plurality of longitudinal segments includes the aft lip.

5. The assembly as recited in claim 2, wherein said transition region includes a landing for receiving a portion of the aft lip.

6. A combustor assembly for a gas turbine engine assembly comprising;

a combustor liner assembly having an outer shell supporting an inner heat shield, wherein said combustor liner assembly defines an annular combustion chamber having a forward end and an open aft end; and fixed turbine vane for directing gas flow from the combustion chamber toward a turbine assembly; wherein said inner heat shield comprises an aft lip that defined an outlet end of the combustor liner assembly, the aft lip overlapping a portion of an inner surface of said fixed turbine vane that is substantially parallel to the gas flow such that part of the fixed turbine vane is disposed downstream of the outlet end.

7. The assembly as recited in claim 6, wherein said inner surface of said fixed turbine vane includes a landing for receiving said aft lip.

8. The assembly as recited in claim 6, wherein the inner heat shield comprises a plurality of heat shields.

9. The assembly as recited in claim 8, wherein the inner surface is disposed a radial distance from a centerline of the combustor assembly equal to or greater than a radial distance from the centerline of an inner surface of the aft lip.

10. The assembly as recited in claim 6, wherein the aft lip includes at least one cooling opening.

* * * * *

UNITED STATES PATENT AND TRADEMARK OFFICE

CERTIFICATE OF CORRECTION

PATENT NO. : 7,934,382 B2
APPLICATION NO. : 11/315838
DATED : May 3, 2011
INVENTOR(S) : Steven W. Burd It is certified that error appears in the above-identified patent and that said Letters Patent is hereby corrected as shown below:

IN THE CLAIMS:

Claim 6, Column 6, Line 16: insert --a-- before “fixed”

Signed and Sealed this
Fourteenth Day of June, 2011

David J. Kappos
*Director of the United States Patent and Trademark Office*